Dec. 18, 1951     T. C. OLIVER     2,578,897
STEERABLE LANDING GEAR
Filed Sept. 11, 1948     4 Sheets-Sheet 1

INVENTOR.
TOMAS CARRILERO OLIVER
BY
ATTORNEY.

Dec. 18, 1951     T. C. OLIVER     2,578,897
STEERABLE LANDING GEAR

Filed Sept. 11, 1948     4 Sheets-Sheet 2

INVENTOR.
TOMAS CARRILERO OLIVER
BY
*ATTORNEY.*

INVENTOR.
TOMAS CARRILERO OLIVER
ATTORNEY.

Dec. 18, 1951     T. C. OLIVER     2,578,897
STEERABLE LANDING GEAR
Filed Sept. 11, 1948     4 Sheets-Sheet 4

INVENTOR.
TOMAS CARRILERO OLIVER
BY
ATTORNEY.

Patented Dec. 18, 1951

2,578,897

UNITED STATES PATENT OFFICE 2,578,897

STEERABLE LANDING GEAR

Tomas Carrilero Oliver, Seville, Spain

Application September 11, 1948, Serial No. 48,809
In Spain February 24, 1948

6 Claims. (Cl. 244—50)

1

The present invention relates to landing gears for aircraft and, more particularly, to means for operatively linking the wheels of a conventional landing gear with the control mechanism which governs the rudder, ailerons, etc. of an aircraft.

An object of the invention is to provide means for controlling the movement of an aircraft on the ground in such manner that interference due to crosswinds will be minimized.

A related object of the invention is to provide means to facilitate take-off and landing by an aircraft on a one-runway field in the face of crosswinds.

Another object of the invention is to provide novel type of control means adapted to be used with any type of aircraft to facilitate taxiing, take-off and landing.

A further object of the invention is to provide mechanism for controlling the landing gear and immobilizing the ailerons during taxiing, take-off and landing.

The above and other objects of the invention will become more fully apparent during the following description of a control mechanism according to the invention suitable for aircraft of dual control, retractable gear type, reference being had to the accompanying drawing in which.

Figure 1:
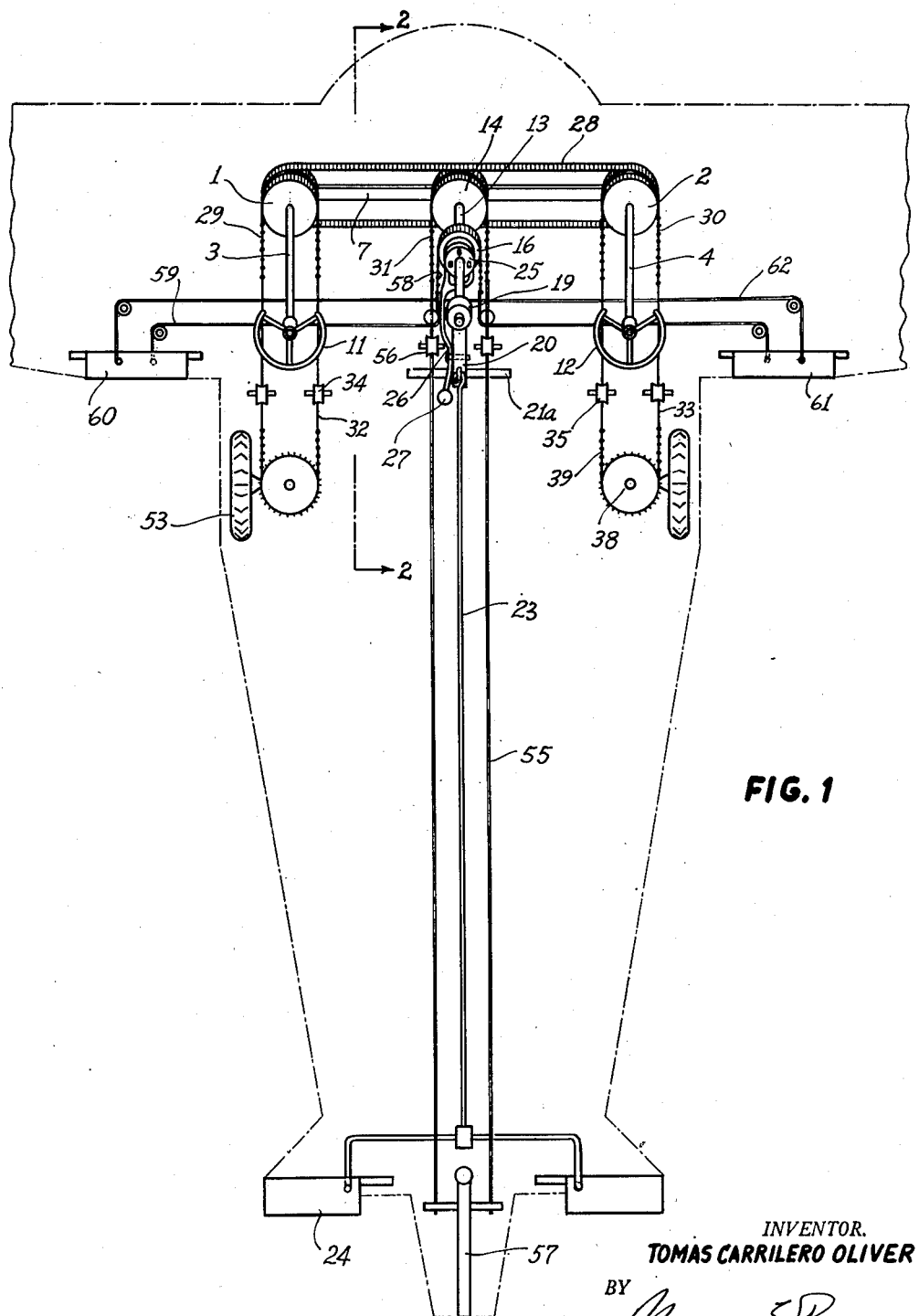
Fig. 1 is a diagrammatic view of the complete mechanism according to the invention, including a perspective top view of the dual controls.

Referring to the drawing, there are shown a pair of sprockets 1, 2 fixed by any convenient means such as threads, bolts or keys (not shown) to a pair of shafts or control columns 3, 4, respectively, each carrying at its upper end a steering wheel 11, 12, respectively. A cross bar 7 is provided with three elongated slots 8, 9 and 10 which serve for the displaceable mounting of the columns 3, 4 and of a short center shaft 13, the latter carrying a sprocket 14. Sprockets 1, 2 and 14 are each provided with two sets or rows of teeth, the forward row of each sprocket being engaged by a closed chain 28 which inter-

2 connects the three sprockets. Slots 8, 9 and 10 permit adjustment of the tension of chain 28.

While the sprockets 1 and 2 are fixedly held on their control columns, sprocket 14 is freely rotatable on the shaft 13, being prevented from substantial axial displacement by the tension of chain 28 although, of course, any convenient additional securing means may be used. Likewise mounted on the shaft 13 for free rotation thereon is a sprocket 16 provided with a single row of teeth. Sprocket 16 is provided on one of its faces with a channeled projection 25 into the channel of which enters an extremity of a forked lever 26 which is pivoted at 26a (Fig. 2) to the control stick 20 whose head 19 is fixedly secured, as by means of a washer 13a and a nut 13b, to the free end of shaft 13. The other extremity of the lever 26 is provided with an operating knob 27.

The face of sprocket 16 opposite projection 25 is provided with a series of lugs 15 adapted to cooperate with a series of depressions 18a provided in the adjacent face of sprocket 14, and the face of projection 25 is provided with similar lugs 17 fitting into depressions 18 provided on the adjacent face of head 19. Thus, by manipulating the lever 26 for axial displacement of the sprocket 16 in one direction or the other, the latter may be associated either with the sprocket 14 for rotative entrainment thereby or with the head 19 for immobilization with respect to the shaft 13.

Figure 2:
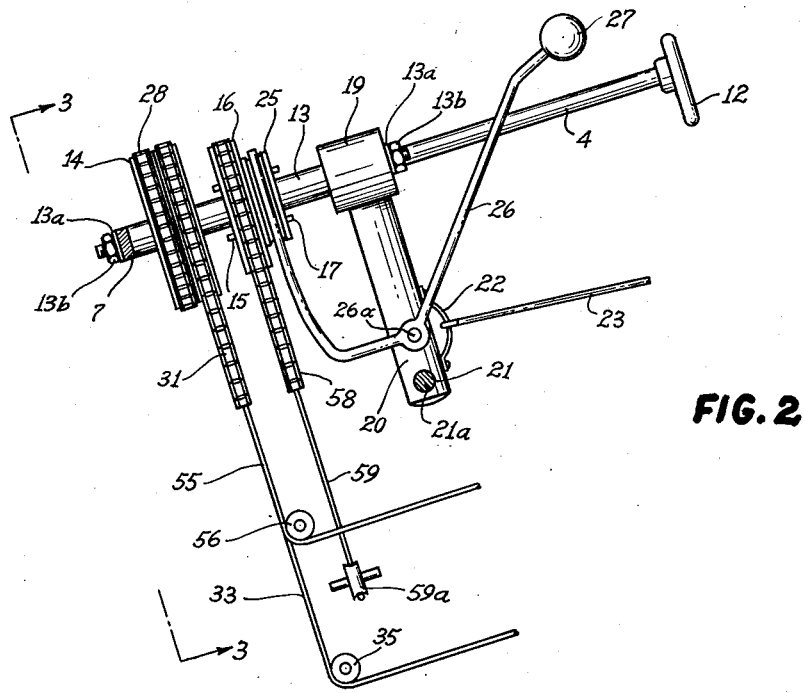
Fig. 2 is a side elevation, partly in section, taken on the line 2—2 of Fig. 1.
Figure 3:
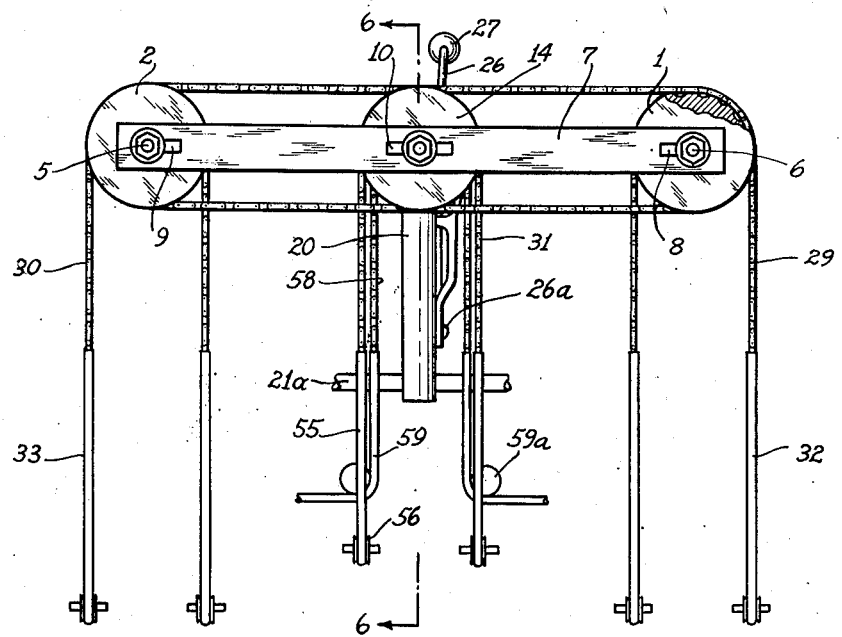
Fig. 3 is a rear view of the controls and other parts of the mechanism, taken on the line 3—3 of Fig. 2.
Figure 6:
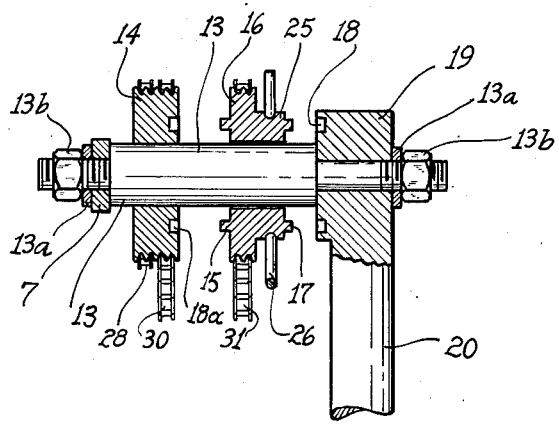
Fig. 6 is a cross section taken on the line 6—6 of Fig. 3.

As best seen in Figs. 2 and 6, another washer 13a and nut 13b may serve to secure the shaft 13 directly to the cross bar 7 at the center slot 10 of the latter; columns 3 and 4, on the other hand, are supported on respective rods or axes 5, 6 the threaded ends of which, in turn, pass through slots 8, 9, respectively, and are secured to the bar 7 by means such as washers and nuts similar to the elements 13a, 13b.

The free end of the stick 20 is provided with a bore 21 through which passes a pin 21a serving as a pivot for the entire assembly 3, 4, 7, 13 and 20. The pin 21a is suitably secured to the frame of the aircraft, shown in dot-dash outlines in Fig. 1.

Figure 4:
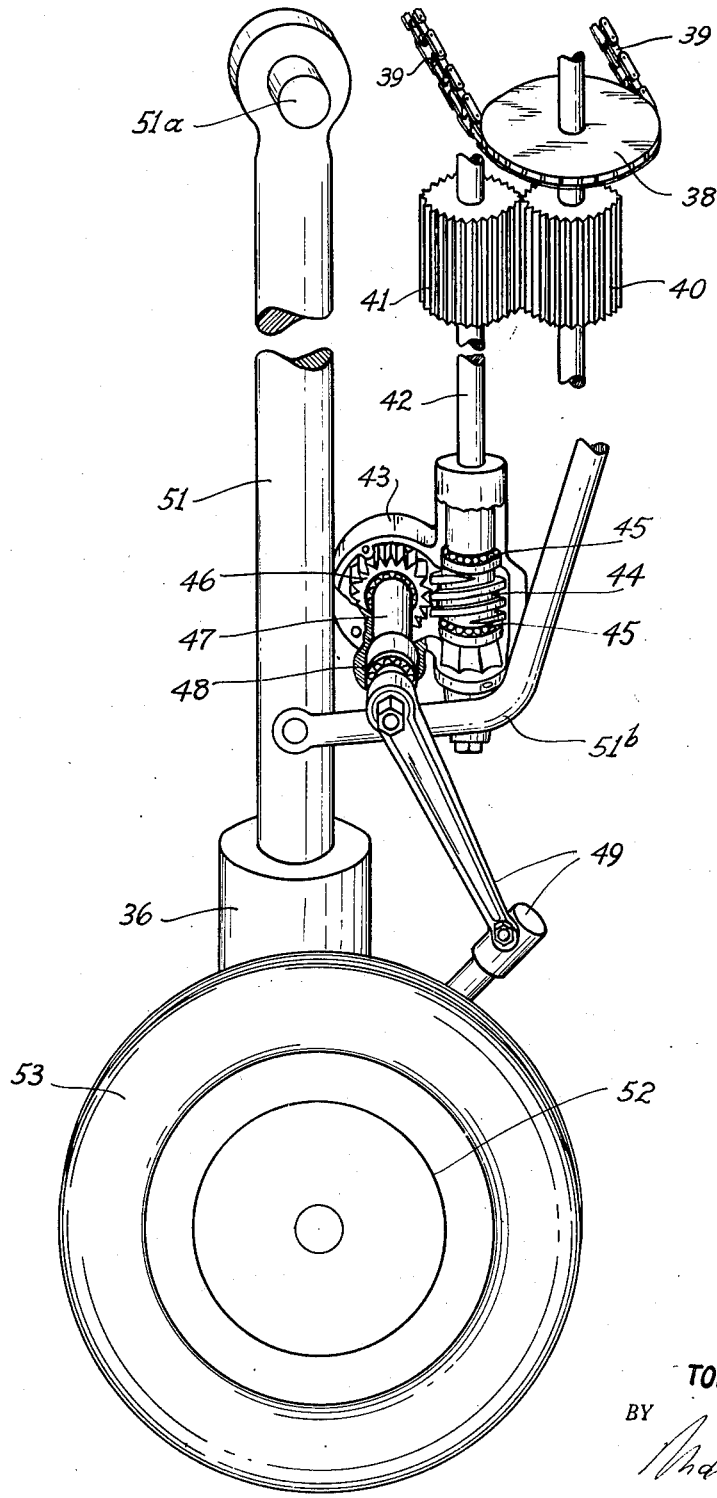
Fig. 4 is a perspective side view of part of the landing gear proper.
Figure 5:
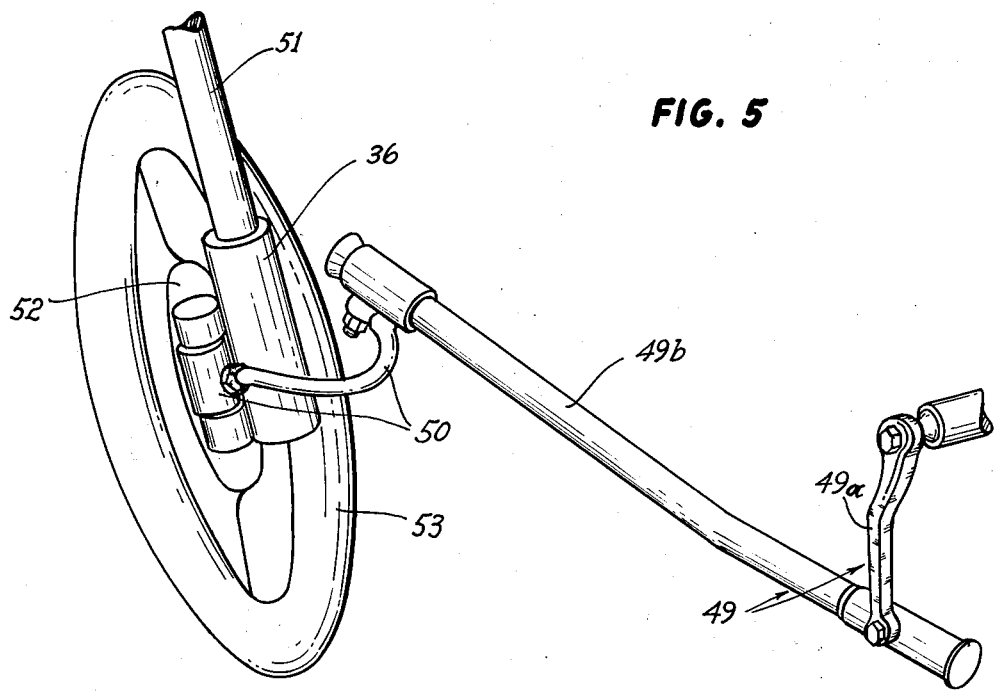
Fig. 5 is a perspective view of a portion of the mechanism shown in Fig. 4.

The other (rearward) rows of teeth of sprockets 1, 2 and 14 mesh with respective open chains 29, 30 and 31. The ends of chain 29 are connected with a pair of wires or cables 32 conducted over sets of rollers 34 to operate one section of the retractable landing gear which comprises a sleeve 36 surrounding the supporting rod 51 of wheel 53. The rod 51 is retractably secured to the frame by being rotatable about a pivot 51a (Fig. 4). Similarly, the ends of chain 30 are connected with a pair of wires or cables 33 conducted over sets of rollers 35 to operate another section of the retractable landing gear comprising a sleeve 36 as well as a supporting rod 51 and a wheel 53. The other extremities of cables 32, 33 are connected, respectively, with the ends of other open chains indicated in Fig. 1 at 39.

The operating mechanism for each section of landing gear controlled by cables 32 and 33 comprises a disc 38 provided with sprocket teeth which mesh with the chain 39, this disc being fixedly connected with a gear 40 held rotatably in suitable bearings (not shown). The gear 40 meshes with another gear 41 which is mounted on a spindle 42 lodged in ball bearings 45, these bearings being held in a control box 43 which is attached to an arm or bracket 51b extending from the rod 51. A worm 44 is fixed to the spindle 42 intermediate the bearings 45 and operatively engages a pinion 46 whose shaft 47 is lodged in ball bearings 48 likewise mounted in the box 43. A power transmission 49, comprising a crank arm 49a pivotally linked to a connecting rod 49b, is coupled by way of a resilient linkage 50 to the sleeve 36 which holds the hub 52 of wheel 53. It will be understood that any rotation of the disc 38, under the control of chain 39, will thus be translated into a swinging movement of the hub 52 of wheel 53 about its supporting rod 51. Where necessary, the gears 40, 41 may be conical and at right angles to each other instead of parallel and cylindrical as shown.

The free (lower) end of stick 20 is provided with a bracket 22 to which is secured a rod 23 which operates the elevators 24 (Fig. 1). The ends of chain 31 are connected with a pair of cables 55 which are guided by rollers 56 and operate the rudder 57 (Fig. 1). A chain 58 meshes with the teeth of sprocket 16 and has its ends connected with a pair of cables 59 which pass over roller 59a and control ailerons 60 and 61, a cable 62 serving to interconnect the ailerons for simultaneous operation in a manner well known per se.

It should be noted that the various rollers shown, such as 34, 35, 56 and 59a, are intended to be merely representative of a system of such rollers designed to guide the various cables to the respective elements controlled thereby. It will be understood that these rollers should be so arranged as to maintain the cables under substantially constant tension irrespective of the angular position of the stick 20, and this can be readily accomplished by positioning the rollers in line with the fulcrum 21a thereof and, if necessary, providing additional rollers, sleeves or other guide means fixed to and swingable with the rotatable system 3, 4, 7, 13, 20.

The operation of the mechanism according to the invention is as follows:

When the aircraft is taxiing on the ground, any rotation of steering wheels 11 and 12 will be communicated to the wheels 53 so that the craft may be steered in much the same manner as an automobile. With the lever 26 manipulated so that the gear 16 is locked to the head 19, the ailerons 60 and 61 will be immobilized in their neutral position so that a displacement thereof due to crosswinds will be rendered impossible. When the craft is airborne and the landing gear has been retracted, by conventional mechanism not further illustrated, the rod 51 will have been rotated clockwise (as viewed in Fig. 4) and gears 40 and 41 will be out of mesh; thus the actuation of cables 32, 33 will have no effect. With the lever 26 manipulated so that the gear 16 is locked to the gear 14, the ailerons 60 and 61 will be under direct control of the wheels 11, 12 for simultaneous displacement with the rudder pivoted at 57.

Depth control is obtained by actuation of elevator fins 24 over rod 23 and stick 20, the latter oscillating about its pivot 21a when the control columns 3, 4 are rocked forward or backward. It will be understood that rod 23 is representative of any conventional arrangement whereby the fins 24 are constrained to rock in step with the stick 20.

Prior to the take-off it is advisable to center the controls for an instant to permit engagement of lugs 17 with depressions 18, the lever 26 being maintained in its position corresponding to such engagement until the craft has attained the desired altitude, whereupon the lever 26 is shifted to effect engagement of 15 with depressions 18a, coupling the gears 16 and 14 together. The reverse procedure should be observed during landing. Thus the ailerons will be locked in their neutral position on the ground as well as during the initial and final stages of a flight.

A centering of the controls should also be effected, in the case of a retractable landing gear, before the latter is to be either retracted or extended, in order to facilitate unmeshing and meshing, respectively, of the gears 40 and 41. Where the landing gear is non-retractable, the gears 40, 41 may be omitted and the disc 38 mounted directly on the spindle 42.

It will also be understood that, where the craft is equipped with a single set of controls rather than the dual controls shown in the drawing, the cross bar 7 as well as the connecting chain 28 will be omitted and all sprockets mounted on a single shaft suitably modified to fulfill the functions of shaft 13 and columns 3 or 4.

Accordingly, while the invention has been described with reference to a single, now preferred embodiment, it is to be understood that the invention is subject to various adaptations and modifications without departing from its spirit or exceeding its scope as defined in the objects and in the appended claims.

What is claimed is:

1. In an aircraft, in combination, a rotatable shaft, manual control means for rotating said shaft, a landing gear including a wheel and mounting means for said wheel including a rod substantially parallel to the plane of the wheel, said wheel having a hub rotatable about said rod, and mechanism operatively linking said wheel to said shaft for rotation about said rod in response to actuation of said control means, said mechanism comprising a movable control arm and a linkage independent of said rod connecting said control arm with said hub, said linkage including a resilient link.

2. In an aircraft, in combination, a set of controls including a set of ailerons, direction control means and a manual control member, a first power transmission element, a second power transmission element displaceable relative to said control member, first coupling means operatively connecting said control member with said first element, second coupling means operatively connecting said first element with said direction control means, third coupling means operatively connecting said second element with said ailerons, a relatively stationary member, cooperating clutch means on said first and second elements, cooperating clutch means on said second element and on said stationary member, and shifting means adapted to engage said second element alternatively with said first element for entrainment thereby and with said stationary member for relative immobilization, whereby said ailerons will either be controllable by said manual control member simultaneously with said direction control means or remain fixed in a neutral position.

3. In an aircraft, in combination, a fixed pivot, a stick swingable around said pivot, a shaft fixed to an extremity of said stick remote from said pivot, a first power transmission element rotatably mounted on said shaft, a second power transmission element rotatably and slidably mounted on said shaft, said extremity and said second element having complementary formations adapted for locking engagement, said two elements having complementary formations adapted for locking engagement, a shifting device operable to engage said second element either with said first element or with said extremity, a transverse member fixed to said shaft, a pair of control columns rotatably secured to said transverse member, manual steering means secured to said control columns, a pair of additional power transmission elements each fixed to a respective one of said columns, first transmission means interconnecting said additional elements and said first element for simultaneous rotation, a landing gear including a wheel and mounting means for said wheel permitting rotation thereof about an axis substantially parallel to itself, mechanism adapted to rotate said wheel about said axis, second transmission means operatively connecting said mechanism with said first and additional elements for actuation thereby, a set of ailerons, and third transmission means operatively connecting said ailerons with said second element for actuation thereby.

4. The combination according to claim 3 wherein said first and additional elements each comprises a sprocket having two rows of teeth, said first transmission means comprising an endless chain engaging one row of teeth of each of said sprockets.

5. The combination according to claim 4 wherein said transverse member is provided with three elongated slots traversed, respectively, by said shaft and by said control columns, said slots permitting for the displaceable mounting of said control columns and said shaft on said transverse member, whereby the tension of said chain may be adjusted.

6. The combination according to claim 3 wherein said shifting device comprises a forked lever pivotally mounted on said stick, said second element being provided with a peripheral channel engaged by the forked end of said lever.

TOMAS CARRILERO OLIVER.

REFERENCES CITED

The following references are of record in the file of this patent:

UNITED STATES PATENTS

| Number | Name | Date |
|---|---|---|
| 1,190,374 | Capdevila | July 11, 1916 |
| 1,786,649 | Gonzalez | Dec. 30, 1930 |
| 1,820,906 | Bowers | Sept. 1, 1931 |
| 2,110,516 | Weick | Mar. 8, 1938 |
| 2,135,073 | Gerhardt et al. | Nov. 1, 1938 |
| 2,331,082 | Smith | Oct. 5, 1943 |
| 2,417,725 | Zuck | Mar. 18, 1947 |
| 2,442,289 | Garehime | May 25, 1948 |
| 2,460,506 | Jamison | Feb. 1, 1949 |

FOREIGN PATENTS

| Number | Country | Date |
|---|---|---|
| 216,594 | Great Britain | June 4, 1924 |
| 260,556 | Germany | June 3, 1913 |